UNITED STATES PATENT OFFICE.

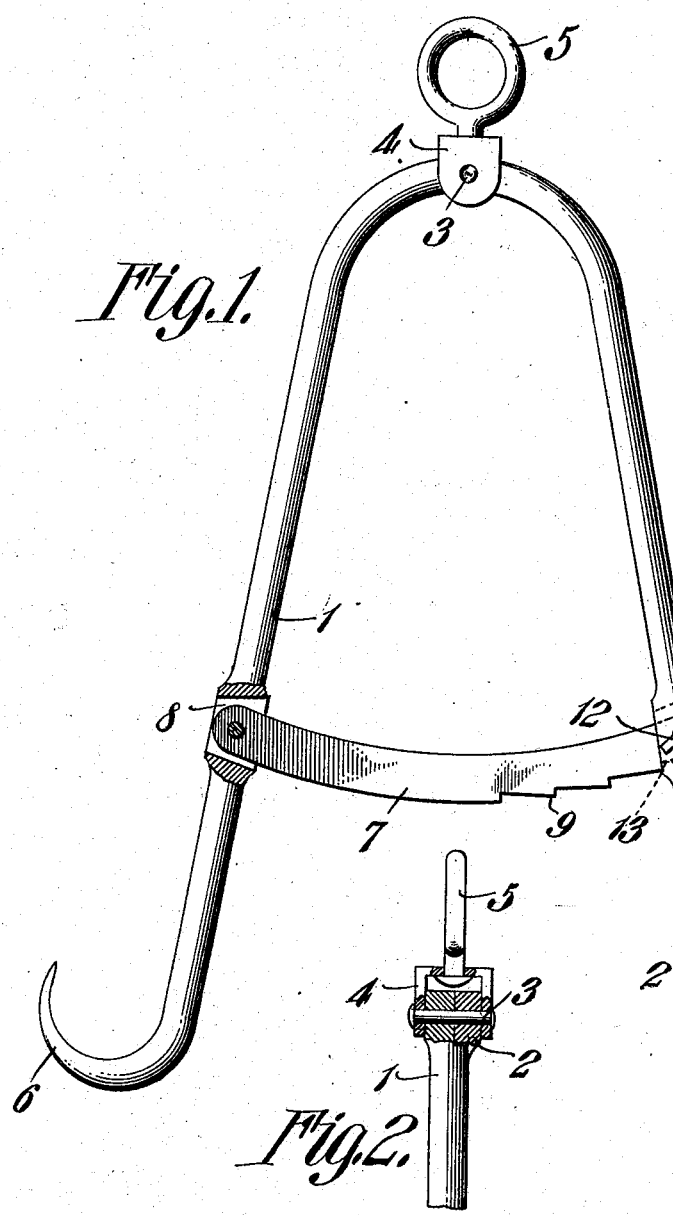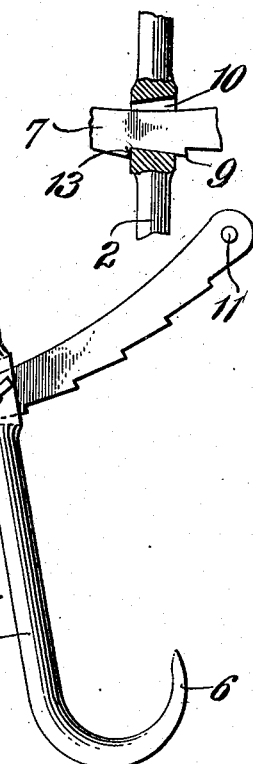

JAMES LENARD SMITH, OF GLEN CAMPBELL, PENNSYLVANIA.

GAMBREL-HOOK.

No. 911,079.  Specification of Letters Patent.  Patented Feb. 2, 1909.

Application filed May 9, 1908. Serial No. 431,960.

*To all whom it may concern:*

Be it known that I, JAMES L. SMITH, a citizen of the United States, residing at Glen Campbell, in the county of Indiana and State of Pennsylvania, have invented a new and useful Gambrel-Hook, of which the following is a specification.

This invention has relation to gambrel-hooks and it consists in a novel construction and arrangement of its parts as hereinafter shown and described.

The object of the invention is to provide a device of the character indicated which is simple in construction and of a durable nature and which may be easily and readily manipulated in order to properly support a carcass or the parts thereof suspended thereon.

The device consists primarily of a pair of hooks which are pivotally connected together at their upper ends. A clip is pivotally mounted upon the pivot pin which connects the said hooks together and an eye is swiveled to the said clip. A segmental bar is pivotally connected with one of the hooks and is adapted to engage a shoulder provided upon the other hook; the last said hook is provided with a set screw which is adapted to engage the bar whereby the said hooks may be fixed with relation to each other. The bar is provided upon its under side with a series of teeth for engagement with the shoulder of the said hook above referred to. The segmental bar passes through an opening in the hook which is provided with a shoulder and said bar is provided at its free end with a transversely disposed pin which is adapted to prevent the said bar from being disconnected from the hook carrying the shoulder.

In the accompanying drawing:—Figure 1 is a side elevation of the gambrel-hooks with parts in section. Fig. 2 is a sectional view of the pivoted ends of the hooks, and Fig. 3 is a sectional view of the shouldered hook member.

The device consists of the hooks 1 and 2 which are pivotally connected together at their upper ends by a transversely disposed pivot-pin 3. The clip 4 is pivoted to the said pin 3 and the eye 5 is swiveled to the said clip 4. The lower extremities of the members 1 and 2 are provided with the outwardly disposed hooks 6.

The segmental bar 7 is pivotally attached at one end to the hook member 1 and is located in a perforation 8 provided therein. The bar 7 is provided at its under edge with the teeth 9. The free end portion of the bar 7 passes through a perforation 10 provided in the hook member 2 and the free end of the said bar 7 is provided with a transversely disposed pin 11 which is adapted to prevent the free end of the said bar from becoming disengaged from the perforation 10 of the hook member 2. The set screw 12 is located at the sides of the hook member 2 and is adapted to impinge the bar 7 in the perforation 10. The curvature of the bar 7 is downwardly disposed and the perforation 10 is provided at its lower sides with a shoulder 13 which is adapted to be engaged by the teeth 9 of the said bar.

The gambrel hook is manipulated as follows: The legs of the carcass are engaged with the hook ends 7 and the members 1 and 2 may be spread apart sufficiently in order to permit of the carcass being split down the middle. As the members 1 and 2 are swung apart the teeth 9 will engage the shoulder 13 of the perforation 10 and hold the members 1 and 2 in their relatively adjusted position. By reason of the fact that the eye 5 is swiveled to the clip 4 the members 1 and 2 may be turned laterally so that the carcass may be presented at any side toward the operator or butcher. When the carcass is hanging upon the members 1 and 2 and it is desired to have the said members swing toward each other the operator may deliver a succession of taps under the free end of the bar 7 and at each tap the said bar will be elevated in the perforation 10 so that the particular tooth 9 in engagement with the shoulder 13 will escape the shoulder and the bars will swing together and the next adjacent tooth 9 will come in contact with the shoulder 13. Thus in order to bring the members 1 and 2 together it is not necessary to lift any of the weight of the carcass and the said members may be brought together by the use of one hand only as above indicated. Furthermore should it be desired to remove half of the carcass while the other half is hanging upon either one of the members 1 or 2 this may be readily done without affecting the relative position of the said gambrel hook as an entirety. When the hook is not in use the parts may be compactly swung and folded together for storage or transportation purposes.

Having described my invention what I claim as new and desire to secure by Letters-Patent is:—

A device of the character indicated, comprising two members pivoted together at their upper ends and being formed into hooks at their outer lower ends, one member having a shoulder formed therein intermediate of its ends, a segmental bar pivotally connected to the other member at a point between the hooked end and the pivotal connection between the members, the convexity of said bar being disposed toward the hooked ends of the members and the convex edge of the bar having teeth for engagement with said shoulder, a clamping screw carried by the shouldered member, a clip attached to the pivot between the members, and an eye swiveled to said clip.

In testimony that I claim the foregoing as my own, I have hereto affixed my signature in the presence of two witnesses.

JAMES LENARD SMITH.

Witnesses:
JESSIE E. MAQUILKEN,
REBECCA J. ARCHIBALD.